US007734187B2

(12) United States Patent
Pilipetskii et al.

(10) Patent No.: US 7,734,187 B2
(45) Date of Patent: Jun. 8, 2010

(54) DISPERSION MANAGEMENT IN OPTICAL NETWORKS USING A DIFFERENTIAL PHASE SHIFT KEYING MODULATION FORMAT

(75) Inventors: Alexei N. Pilipetskii, Colts Neck, NJ (US); Ekaterina A. Golovchenko, Colts Neck, NJ (US); William T. Anderson, Red Bank, NJ (US); Alan J. Lucero, East Brunswick, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 318 days.

(21) Appl. No.: 11/201,762

(22) Filed: Aug. 11, 2005

(65) Prior Publication Data

US 2006/0045533 A1    Mar. 2, 2006

Related U.S. Application Data

(60) Provisional application No. 60/600,621, filed on Aug. 11, 2004.

(51) Int. Cl.
*H04B 10/18* (2006.01)
(52) U.S. Cl. .................................................... 398/147
(58) Field of Classification Search ................. 398/104, 398/147–150, 159, 178, 81
See application file for complete search history.

(56) References Cited

U.S. PATENT DOCUMENTS 6,930,824 B1 *   8/2005   Ishikawa et al. ........ 359/341.32

OTHER PUBLICATIONS

Vaa, M. et al. "Demonstration of 640 Gbit/s×7000 km submarine transmission system technology ready for field deployment." Optical Fiber Communication Conference and Exhibit, 2001. OFC 2001. vol. 3: WF5-1 to WF5-3.*
Tsuritani et al; "70-GHz-Spaced 40×42.7 Gb/s Transpacific Transmission Over 9400 km Using Prefiltered CSRZ-DPSK Signals, All-Raman Repeaters, and Symmetrically Dispersion-Managed Fiber Spans"; Journal of Lightwave Technology, vol. 22, No. 1, Jan. 2004; pp. 215-224.
Becouarn et al; "42×42.7 Gb/s RZ-DPSK Transmission Over a 4820 km long NZDSF deployed line using C-band-only EDFAs"; Optical Fiber Communication Conference 2004; OFC 2004, vol. 2, Feb. 23-27, 2004; pp. 1-3.
Yamada et al; "25 GHz spacing ultra-dense WDM transmission experiment of 1 Tbit/s (100 WDM×10 Gbit/s) over 7300 km using non pre-chirped RZ format"; Electronic Letters, Dec. 9, 1999, vol. 35, No. 25, pp. 2212-2213.
International Search Report issued in corresponding PCT patent application No. PCT/US05/28644.
International Preliminary Report and Written Opinion issued in corresponding PCT patent application No. PCT/US05/28644.
Australian Office Action dated Mar. 6, 2009 issued in related Australian Patent Application No. 2005271241.

* cited by examiner

*Primary Examiner*—Leslie Pascal
(74) *Attorney, Agent, or Firm*—Grossman, Tucker, Perreault & Pfleger, PLLC

(57) ABSTRACT

Dispersion may be managed in an optical network configured to transmit differential phase shift keying (DPSK) modulated signals by allowing accumulation of dispersion to thousands of ps/nm before compensating. A dispersion map providing a negative average dispersion and a minimum dispersion wavelength outside of the signal band may be employed.

20 Claims, 2 Drawing Sheets

DISPERSION MANAGEMENT IN OPTICAL NETWORKS USING A DIFFERENTIAL PHASE SHIFT KEYING MODULATION FORMAT

CROSS-REFERENCE TO RELATED APPLICATIONS

This application claims the benefit of provisional application Ser. No. 60/600,621 filed Aug. 11, 2004, which is fully incorporated herein by reference.

TECHNICAL FIELD

The present invention relates to optical networks and more particularly, to dispersion management in an optical network using a differential phase-shift-keying modulation format.

BACKGROUND

Light propagating within an optical fiber may undergo chromatic dispersion, i.e. different wavelengths of the light may travel at different group velocities leading to varying wavelength-dependent delays in transmission. The chromatic dispersion imparted by an optical fiber may be characterized by: (1) the dispersion at one specific wavelength, and (2) the dispersion slope. The dispersion slope indicates the extent to which dispersion varies as a function of wavelength.

The dispersion slope of an optical fiber can significantly limit the usable bandwidth for a wavelength-division multiplex (WDM) system, which uses multiple information channels each having their own wavelength of light. Each information channel can accumulate its own amount of dispersion on the transmission length. For example, in a WDM system having 10 Gb/s data-rate information channels, the information channels can accumulate a large amount of dispersion over long transmission distances, such as transoceanic transmission distances (e.g., 7000-10,000 km). When the accumulated dispersion is too large, the system performance utilizing On-Off-Keying (OOK) modulation format is degraded due to intersymbol interference which in turn limits the system bandwidth.

Various dispersion management techniques have been used to manage dispersion. One dispersion management technique involves dispersion mapping where optical fiber types are selected and arranged to manage the dispersion in the transmission segments of an optical communication system. One example of a transmission segment design mixes spans of non-zero dispersion-shifted fiber (NZDSF) or spans of dispersion flattened fiber (DFF) having a non-zero dispersion with spans of dispersion compensation fiber (DCF) to realize periodic dispersion compensation over the length of the optical transmission segment. The length of each period in such periodic dispersion maps may be in the range of about 500 km per period.

For conventional systems utilizing OOK modulation formats, such dispersion mapping techniques have been useful in maintaining a low end-to-end path average dispersion and suppressing fiber nonlinearities. It has been recognized, however that that differential phase-shift-keying (DPSK) modulation formats can provide advantages over OOK. In DPSK modulation formats ones and zeros are indicated by differential phase transitions. DPSK formats include Return-to-Zero DPSK (RZ-DPSK), wherein a return-to-zero amplitude modulation is imparted to a DPSK signal, and Chirped-Return-to-Zero DPSK (CRZ-DPSK). Compared to OOK, RZ-DPSK modulation may, for example, provide a potential 3 dB reduction in the required optical signal-to-noise (OSNR) for a particular bit error rate (BER) when using a balanced receiver and reducing cross-phase modulation (XPM) penalties.

Accordingly, there is a need for dispersion management in optical networks using DPSK modulation formats.

BRIEF DESCRIPTION OF THE DRAWINGS

These and other features and advantages of the present invention will be better understood by reading the following detailed description, taken together with the drawings wherein.

DETAILED DESCRIPTION

Figure 1:
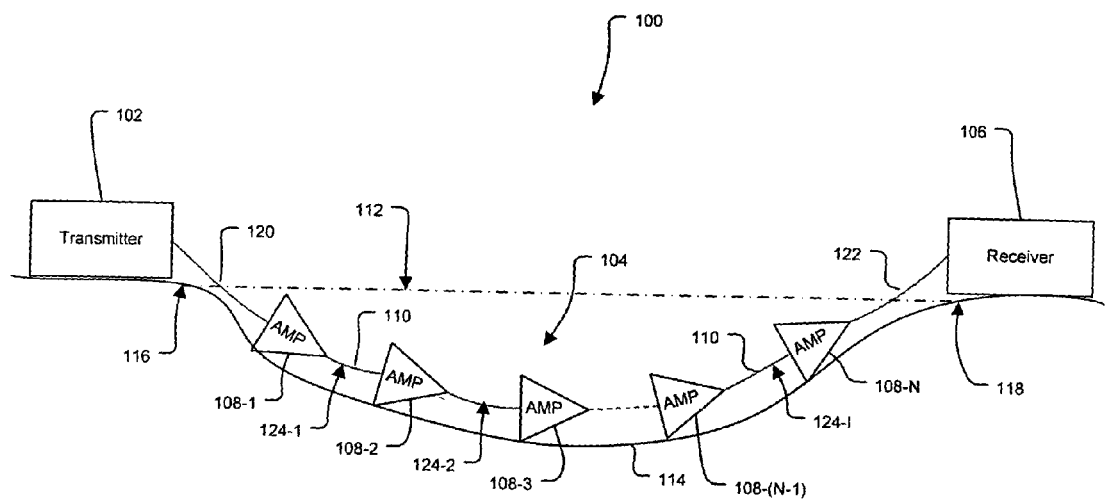
FIG. 1 is a schematic diagram of an optical communication system, consistent with one embodiment of the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. It is to be understood the present invention may be incorporated into a wide variety of optical network and systems.

The illustrated exemplary optical communication system 100 includes a transmitter 102 and a receiver 106 connected via an optical transmission path 104. Data may be modulated on a plurality of wavelengths at the transmitter 102 for transmission over the optical information channel 104. Although the system 100 is illustrated as including a distinct transmitter 102 and receiver 106, those of ordinary skill in the art will recognize the transmitter 102 and receiver 106 may each be configured as a transceiver to facilitate bi-directional communication over the optical information channel.

Depending on system characteristics and requirements, the optical transmission path 104 may include, optical transmission fiber 110, optical amplifiers/repeaters 108-1, 108-2, 108-3, 108-(N−1), 108-N, optical filters, and other active and passive components. A variety of configurations for each of these elements will be known to those skilled in the art. For clarity, only optical amplifiers/repeaters 108-1, 108-2, 108-3, 108-(N−1), 108-N and optical transmission fiber 110 are illustrated in the optical information channel 104.

System 100 may be employed to span a body of water 112. When used to span a body of water, e.g. an ocean, amplifiers/repeaters 108-1, 108-2, 108-3, 108-(N−1), 108-N may be seated on the ocean floor 114 and the transmission path 104 may span between beach landings 116, 118 to extend from the water 112 for coupling to the transmitter 102 and receiver 106. It will be appreciated that a plurality of optical transmission components may be coupled to the transmission path 104 and may be disposed beneath water and/or over land.

In general, the distance between optical amplifiers defines a transmission span length. For example, a system configured to span a body of water will include at least first 120 and second 122 shore spans. In the illustrated exemplary embodiment, a first shore span 120 extends between the transmitter 102 and the first amplifier/repeater 108-1 and a second shore span 122 extends from the final amplifier/receiver 108-N to the receiver 106. Those or ordinary skill in the art will recognize that span lengths may vary significantly in a particular system. In a long-haul system, for example, some spans may be as short as 20 kilometers, while the average span may be about 40 kilometers to about 50 kilometers depending on system characteristics and requirements. In view of the span length variation, signal attenuation and dispersion vary from span-to-span.

Conventional dispersion management techniques in OOK systems involve compensation of accumulated dispersion to bring the dispersion to zero or close to zero on a regular or periodic basis by inserting dispersion compensation fiber in one or more spans following one or more spans of large mode fiber such as non-zero dispersion shifted fiber (NZDSF). In contrast, it has been discovered that the performance of a DPSK system is degraded when compensating accumulated dispersion to zero or close to zero on a regular basis. In a system consistent with the present invention, therefore, data may be modulated on a plurality of wavelengths in a WDM system using a DPSK modulation format, and dispersion management may be accomplished according to a dispersion map that allows accumulation of dispersion to thousands of picoseconds/nanometer (ps/nm) (e.g. at least −2000 ps/nm in one embodiment) for all wavelength in the system bandwidth, e.g. by allowing accumulation of dispersion with average dispersion at least −0.2 ps/nm/km). In addition dispersion of 4,000 to 5,000 ps/nm or more may be imparted for at least one wavelength in the system bandwidth, e.g. by allowing accumulation at a rate of −0.4 to −0.5 ps/nm/km of average dispersion. In addition, it has been discovered that optimum performance in a DPSK modulated system may be achieved by allowing dispersion to accumulate with a negative average dispersion. Also, in one embodiment performance may be optimized by configuring the dispersion map so that the system has a negative average dispersion with the minimum dispersion wavelength ($\lambda_0$) outside of the signal band.

Figure 2:
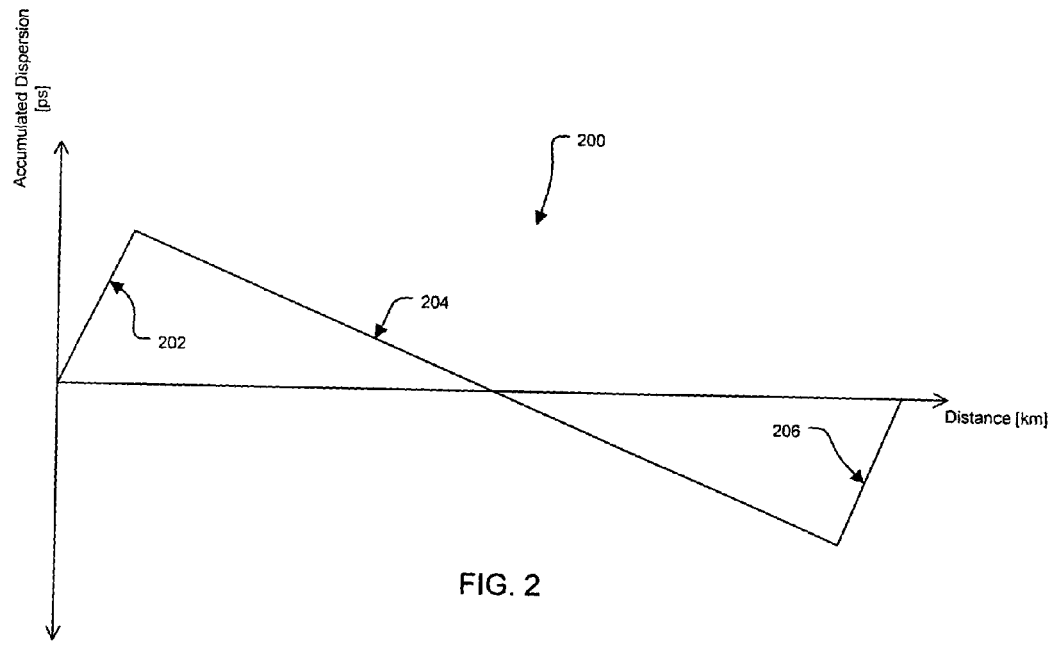
FIG. 2 is a dispersion map showing accumulated dispersion vs. distance consistent with one embodiment of the present invention.

Allowing dispersion to accumulate to thousands of ps/nm in a DPSK modulated allows a significant simplification of the system dispersion map. Turning to FIG. 2, for example, there is illustrated an exemplary dispersion map, represented by plot 200, for an exemplary system 100 consistent with the invention wherein the shore spans 120, 122 include dispersion compensating fiber (DCF) and the remaining spans 124-1, 124-2, 124-I, are constructed from non-zero dispersion flattened fiber (DFF) to form a dispersion accumulation portion of the transmission span. Those of ordinary skill in the art will recognize that DFF generally imparts an essentially uniform accumulated dispersion, e.g. varying less than 0.3 ps/km across a band of wavelengths.

The plot 200 has several portions 202, 204, 206. The first portion 202 indicates a positive compensation by a positive DCF at the shore span 120. The positive DCF may be a fiber such as the type available from OFS under the name Ultrawave SLA. The second portion 204 of the plot indicates accumulation of negative dispersion over the DFF of the spans 124-1, 124-2, 124-I to thousands of ps/nm for each wavelength in the system bandwidth. The DFF spans consist of two fiber types available for example from OFS under the names Ultrawave SLA and Ultrawave IDF, and may exhibit a negative average span dispersion depending on the ratio of the length of the SLA and IDF fibers in DFF span. The third portion 206 of the plot 200 indicates positive compensation by a positive DCF at the shore span 122 to return the accumulated dispersion back to a zero or near zero dispersion level for the minimum dispersion wavelength ($\lambda_0$). Again, optimum performance may be achieved with $\lambda_0$ outside of the signal bandwidth in section 204.

In one embodiment, for example, dispersion may be allowed to accumulate on the DFF at a rate of −0.2 ps/nm/km or more for all wavelengths in the signal bandwidth, and may exceed the rate of accumulation of −0.4 to −0.5 ps/nm/km or more for at least one wavelength in the signal bandwidth. It has been recognized that DPSK modulated WDM systems are tolerant to accumulated dispersion in excess of −18,000 ps/nm. Thus, dispersion compensation may be provided only at one or more of the shore spans 120, 122 across even trans-pacific distances of 10,000 km or more. In systems where compensation for accumulated dispersion cannot be fully compensated to a desired level at the shore spans 120, 122, e.g. the shore span length is not sufficient to provide the desired dispersion compensation, the one or more of the spans immediately adjacent the shore spans, e.g. spans 124-1 and 124-I, may include DCF to provide any additional desired compensation.

Providing dispersion compensation at and/or adjacent to the shore spans 120, 122 can significantly simplify construction and installation of the optical transmission path leading to improvements in system cost and complexity. Dispersion compensation for a DPSK modulated system may, however, be provided at any location on the optical transmission path where the total accumulated dispersion for all signals in the system bandwidth reaches a level of thousands of ps/nm, e.g. −2000 ps/nm for a system constructed using DFF. As such, dispersion compensation may be provided in the middle of an optical path, at the middle and at one or more of the shore spans, or other locations or combination of locations.

The specific negative average dispersion accumulation and minimum dispersion wavelength for optimizing performance of a particular system may vary depending on system characteristics and requirements. In one embodiment using DFF and having a 64 channels at 33 GHz spacing, a system bandwidth between 1542.1 nm and 1559 nm, and a total system length of about 6800 km, an optimum system Q may be achieved using a system with average dispersion of about −0.5 ps/(nm·km), producing about −3400 ps/nm of accumulated dispersion with a difference in accumulated dispersion across the system bandwidth of less than 850 ps/nm. In another embodiment, using DFF and having a total system length of about 10,300 km optimum system Q may be achieved may be achieved using an average dispersion of about −0.43 ps/(nm·km), producing about −4400 ps/nm of accumulated dispersion with a difference in accumulated dispersion across the system bandwidth of less than 325 ps/nm. The relatively minor difference in accumulated dispersion across the system bandwidth, compared to the total accumulated dispersion, indicates that $\lambda_0$ is outside of the signal bandwidth.

A system consistent with the present invention may also be constructed from a fiber such as a non-zero dispersion shifted fiber (NZDSF). Dispersion may be allowed to accumulate on the DPSK modulated wavelengths for several thousands of ps/nm, e.g., about 2000 ps/nm for all wavelengths in the signal band with a negative average dispersion. Dispersion may be compensated after such accumulation by dispersion compensating fiber (DCF) such as conventional single mode fiber (conventional SMF). The NZDSF may be a fiber such as the True Wave XL and/or SRS available from OFS; LEAF available from Corning. The conventional SMF may include fiber such as AllWave available from OFS; or SMF-28 available from Corning. In one example, the NZDSF may have a dispersion of about −3 ps/nm and the conventional SMF may have a dispersion of about 17 ps/nm. Although the exemplary embodiments described herein use specific types of fibers, those skilled in the art will recognize that the dispersion mapping techniques consistent with the embodiments of the present invention may be implemented with other fiber types.

Figure 3:
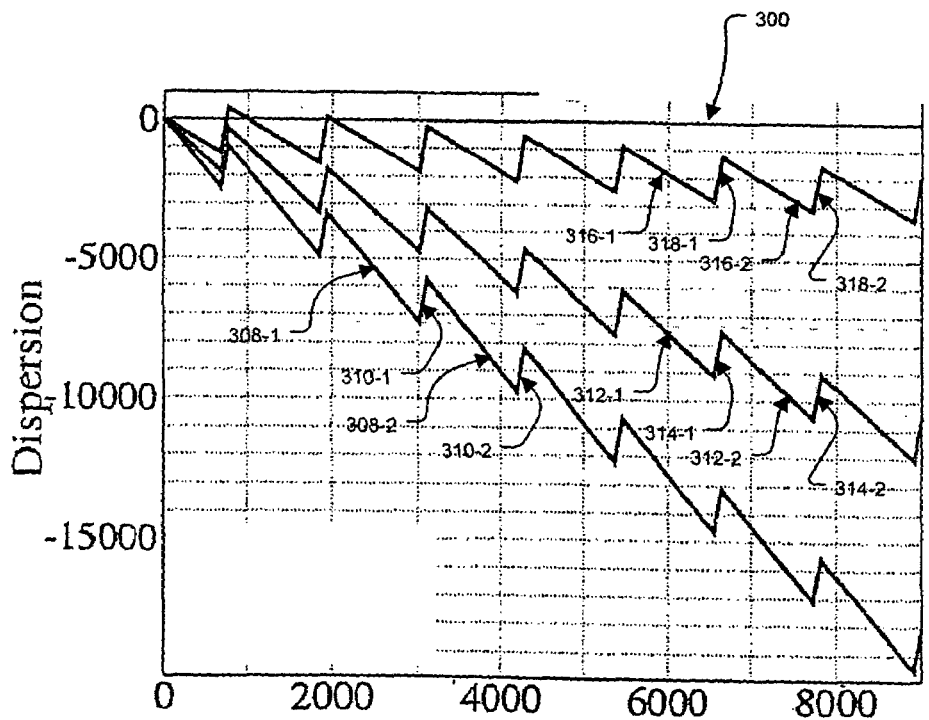
FIG. 3 is a dispersion map showing accumulated dispersion vs. distance consistent with another embodiment of the present invention.

Again, allowing dispersion to accumulate to thousands of ps/nm in a DPSK modulated system allows a significant simplification of the cost and complexity of the system. In FIG. 3, for example, there is illustrated an exemplary dispersion map 300 for an exemplary system 100 consistent with the invention wherein the optical transmission path is constructed from NZDSF compensated by conventional SMF. The system bandwidth in FIG. 3 extends from 1542.1 nm to 1559.0 nm and includes 64 DPSK modulated channels. The illustrated exemplary dispersion map 300 includes plots 302, 304 and 306 showing accumulated dispersion vs. distance for the shortest wavelength 1542.1 nm, a middle wavelength 1550.0 nm, and the longest wavelength 1559.0 nm, respectively.

In the illustrated exemplary embodiment, multiple dispersion accumulation portions, e.g. encompassing several spans, are established in the transmission path by NZDSF and multiple dispersion compensation portions are established in the transmission path by the conventional SMF. For example, plot 302 illustrates accumulation of negative dispersion on the NZDSF fiber, e.g. in segments 308-1, 308-2, etc. of the plot, with compensation by positive dispersion of conventional SMF, e.g. in segments 310-1, 310-2, etc. of the plot. Plot 304 illustrates accumulation of negative dispersion on the NZDSF fiber, e.g. in segments 312-1, 312-2, etc. of the plot, with compensation by positive dispersion of conventional SMF, e.g. in segments 314-1, 314-2, etc of the plot. Plot 306 illustrates accumulation of negative dispersion on the NZDSF fiber, e.g. in segments 316-1, 316-2, etc. of the plot, with compensation by positive dispersion conventional SMF, e.g. in segments 312-1, 312-2, etc. of the plot. As shown, on each segment of NZDSF about −2000 ps/nm of dispersion is allowed to accumulate on the long wavelength (1559 nm), about −3000 ps/nm of dispersion is allowed to accumulate at 1550 nm, and about −4000 ps/nm of dispersion is allowed to accumulate on short wavelength (1542.1 nm). Thus, dispersion for each wavelength on the order of thousands of ps/nm is allowed to accumulate on the NZDSF prior to compensation by the conventional SMF.

Figure 4:
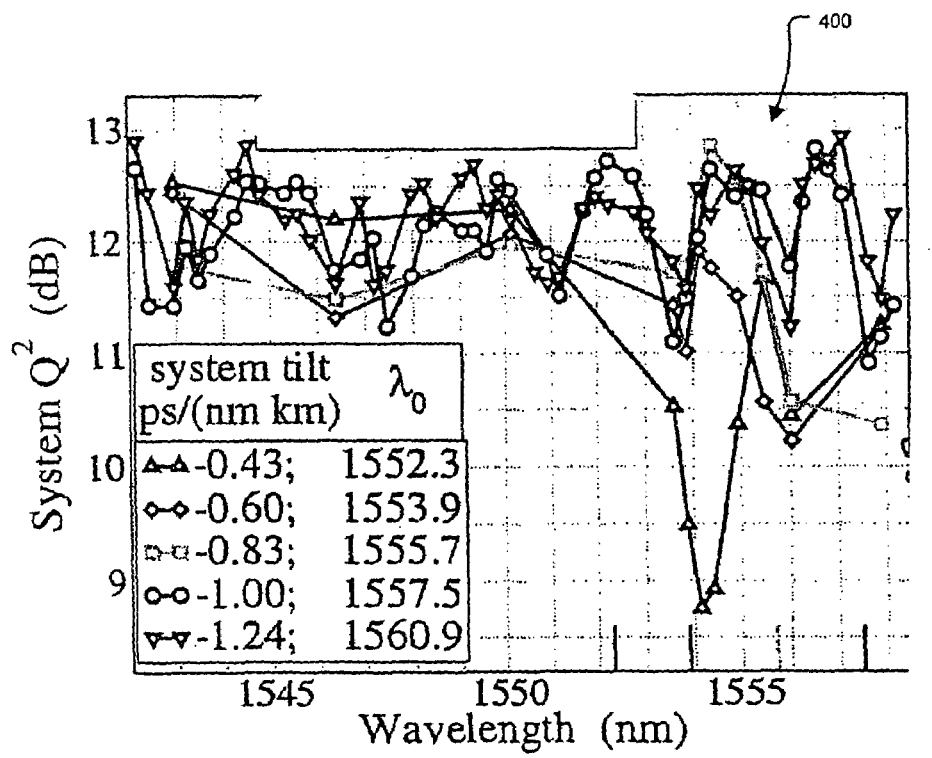
FIG. 4 is a plot of system Q vs. wavelength for various system average dispersions illustrating an optimal system average dispersion consistent one embodiment of the present invention.

FIG. 4 illustrates plots of System $Q^2$ (dB) vs. wavelength across the bandwidth (1540.1 nm to 1559.0 nm) of the system illustrated in FIG. 3 for system average dispersion in the middle of the transmission bandwidth from −0.43 ps/(nm·km) to −1.24 ps/(nm·km), and shows the minimum dispersion wavelength $\lambda_0$ associated with each system average dispersion. A system average dispersion of −1.24 ps/(nm·km) resulted a mean system $Q^2$ across all wavelengths in the system bandwidth of about 12.21 dB, which was the highest mean system $Q^2$ for any system average dispersion. At the optimum system average dispersion of −1.24 ps/(nm·km), the minimum dispersion wavelength $\lambda_0$ was outside the system bandwidth at about 1560.9 nm.

According to one aspect of the invention, there is thus provided an optical communication system including a transmitter configured to transmit a plurality of optical signals at different associated wavelengths within a signal band of wavelengths using a differential phase shift keying (DPSK) modulation format; a receiver configured to received the plurality of optical signals; and a transmission path extending between the transmitter and the receiver. The transmission path includes at least one dispersion accumulation portion configured to allow accumulation of dispersion at a rate of at least −0.4 ps/nm/km for at least one of said wavelengths, and at least one dispersion compensation portion coupled to the dispersion accumulation portion and configured to compensate for at least a portion of the dispersion accumulated on the dispersion accumulation portion.

According to another aspect of the invention, there is provided an optical communication system including a transmitter configured to transmit a plurality of optical signals at different associated wavelengths within a signal band of wavelengths using a differential phase shift keying (DPSK) modulation format; a receiver configured to received the plurality of optical signals; and a transmission path extending between the transmitter and the receiver. The transmission path establishes a negative average dispersion across the wavelengths with a minimum dispersion wavelength outside of the signal band, and includes at least one dispersion accumulation portion. The dispersion accumulation portion includes a plurality of transmission spans and is configured to allow accumulation of dispersion at a rate of at least −0.4 ps/nm/km for at least one of said wavelengths. The transmission path further includes at least one dispersion compensation portion coupled to the dispersion accumulation portion and configured to compensate for at least a portion of the dispersion accumulated on the dispersion accumulation portion.

According to another aspect of the invention, there is provided a method of managing dispersion in an optical communication system, the method including: transmitting a plurality of optical signals at different associated wavelengths within a signal band of wavelengths using a differential phase shift keying (DPSK) modulation format; allowing accumulation of chromatic dispersion at a rate of at least −0.4 ps/nm/km for at least one of said wavelengths as the optical signals propagate on a transmission path; and compensating for chromatic dispersion in the optical signals after the allowing the chromatic dispersion to accumulate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical communication system having a system bandwidth that includes a plurality of differential phase shift keying (DPSK) modulated channels, said system comprising:
   a transmitter configured to transmit a plurality of optical signals at different associated wavelengths within a signal band of wavelengths included in said system bandwidth using a DPSK modulation format, wherein said system bandwidth includes the entire range of said wavelengths at which optical signals are transmitted by said transmitter;
   a receiver configured to receive said plurality of optical signals; and
   a transmission path extending between said transmitter and said receiver, said transmission path comprising at least one dispersion accumulation portion configured to allow accumulation of dispersion at a rate of −0.4 ps/nm/km or more negative for at least one of said wavelengths, and at least one dispersion compensation portion coupled to said dispersion accumulation portion and configured to compensate for at least a portion of the dispersion accumulated on said dispersion accumulation portion;

wherein said transmission path establishes a negative average dispersion across said wavelengths such that negative dispersion accumulated on said dispersion accumulation portion is returned to a zero or near zero dispersion level for a minimum dispersion wavelength that is outside of said system bandwidth.

2. The optical communication system of claim 1, wherein said transmission path has a first dispersion compensation portion proximate said transmitter and a second dispersion compensation portion proximate said receiver.

3. The optical communication system of claim 2, wherein said negative dispersion accumulated on said dispersion accumulation portion is returned to a zero or near zero dispersion level for said minimum dispersion wavelength by at least one of the first and second dispersion compensation portions.

4. The optical communication system of claim 1, wherein said dispersion accumulation portion allows accumulation of dispersion at a rate of −0.2 ps/nm/km or more negative for each of said wavelengths.

5. The optical communication system of claim 1 wherein said transmission path spans a body of water and wherein said system comprises first and second dispersion compensation portions, said first dispersion compensation portion comprising a first shore span extending from said water for coupling to said transmitter and said second dispersion compensation portion comprising a second shore span extending from said water for coupling to said receiver.

6. The optical communication system of claim 5, wherein said system comprises only one dispersion accumulation portion extending between said first and second dispersion compensation portions.

7. The optical communication system of claim 6, wherein said negative dispersion accumulated on said dispersion accumulation portion is only returned to a zero or near zero dispersion level for said minimum dispersion wavelength by the first and second dispersion compensation portions.

8. The optical communication system of claim 6, wherein said only one dispersion accumulation portion comprises dispersion flattened fiber (DFF).

9. The optical communication system of claim 6, wherein said only one dispersion accumulation portion comprises a plurality of transmission spans.

10. The optical communication system of claim 1 wherein said system comprises a plurality of said dispersion accumulation portions and a plurality of said dispersion compensation portions.

11. The optical communication system of claim 10, wherein said each of said dispersion accumulation portions allows accumulation of dispersion at a rate of −0.2 ps/nm/km or more negative for each of said wavelengths.

12. The optical communication system of claim 1, wherein said negative dispersion accumulated on said dispersion accumulation portion is only returned to a zero or near zero dispersion level for said minimum dispersion wavelength by a dispersion compensation portion proximate said receiver.

13. An optical communication system having a system bandwidth that includes a plurality of differential phase shift keying (DPSK) modulated channels, said system comprising:

a transmitter configured to transmit a plurality of optical signals at different associated wavelengths within a signal band of wavelengths included in said system bandwidth using a DPSK modulation format, wherein said system bandwidth includes the entire range of said wavelengths at which optical signals are transmitted by said transmitter, a receiver configured to receive said plurality of optical signals; and a transmission path extending between said transmitter and said receiver, said transmission path establishing a negative average dispersion across said wavelengths with a minimum dispersion wavelength outside of said system bandwidth, said transmission path comprising at least one dispersion accumulation portion, said dispersion accumulation portion comprising a plurality of transmission spans and configured to allow accumulation of dispersion at a rate of −0.4 ps/nm/km or more negative for at least one of said wavelengths, said transmission path further comprising at least one dispersion compensation portion coupled to said dispersion accumulation portion and configured to compensate for at least a portion of the dispersion accumulated on said dispersion accumulation portion;

wherein negative dispersion accumulated on said dispersion accumulation portion is returned to a zero or near zero dispersion level for said minimum dispersion wavelength at least in part by a dispersion compensation portion proximate said receiver.

14. The optical communication system of claim 13, wherein said dispersion accumulation portion allows accumulation of dispersion at a rate of −0.2 ps/nm/km or more negative for each of said wavelengths.

15. The optical communication system of claim 13, wherein said transmission path spans a body of water and wherein said system comprises first and second dispersion compensation portions, said first dispersion compensation portion comprising a first shore span extending from said water for coupling to said transmitter and said second dispersion compensation portion comprising a second shore span extending from said water for coupling to said receiver.

16. The optical communication system of claim 15, wherein said system comprises only one dispersion accumulation portion extending between said first and second dispersion compensation portions.

17. The optical communication system of claim 13 wherein said system comprises a plurality of said dispersion accumulation portions and a plurality of said dispersion compensation portions.

18. A method of managing dispersion in an optical communication system having a system bandwidth that includes a plurality of differential phase shift keying (DPSK) modulated channels, said method comprising:

transmitting a plurality of optical signals at different associated wavelengths within a signal band of wavelengths included in said system bandwidth using a DPSK modulation format, wherein said system bandwidth includes the entire range of said wavelengths at which optical signals are transmitted;

allowing accumulation of chromatic dispersion at a rate of −0.4 ps/nm/km or more negative for at least one of said wavelengths as said optical signals propagate on a transmission path, wherein said transmission path establishes a negative average dispersion across said wavelengths such that negative dispersion accumulated on a dispersion accumulation portion of said path is returned to a zero or near zero dispersion level for a minimum dispersion wavelength that is outside of said system bandwidth; and compensating for chromatic dispersion in said optical signals after said allowing said chromatic dispersion to accumulate.

19. The method of claim 18, wherein said negative accumulated chromatic dispersion is returned to a zero or near zero dispersion level for the minimum dispersion wavelength at least in part by a dispersion compensation portion proximate a receiver of said system.

20. The method of claim 18, wherein dispersion is allowed to accumulate at a rate of −0.2 ps/nm/km or more negative for each of said wavelengths.

* * * * *